United States Patent [19]

Thompson

[11] 4,312,612
[45] Jan. 26, 1982

[54] SCREW FIXING DEVICE

[75] Inventor: Bruce R. Thompson, Tranmere, Australia

[73] Assignee: United Packages Limited, Queensland, Australia

[21] Appl. No.: 44,318

[22] Filed: May 31, 1979

[51] Int. Cl.³ .............................................. F16B 13/04
[52] U.S. Cl. ........................................ 411/15; 411/34; 411/37; 411/74
[58] Field of Search ................... 85/71, 80, 81, 82, 83, 85/84, 85; 411/34, 37, 15, 71, 73, 74, 61

[56] References Cited

U.S. PATENT DOCUMENTS

| | | | |
|---|---|---|---|
| 3,174,387 | 3/1965 | Fischer | 85/71 |
| 3,232,163 | 2/1966 | Croessant | 85/83 |
| 3,283,642 | 11/1966 | Ott | 85/83 |
| 3,343,441 | 9/1967 | Van Buren, Jr. | 85/80 |
| 3,605,548 | 9/1971 | Mortensen | 85/82 X |

FOREIGN PATENT DOCUMENTS 2741061  3/1978  Fed. Rep. of Germany .......... 85/80

Primary Examiner—James T. McCall
Attorney, Agent, or Firm—Oldham, Oldham, Hudak & Weber Co.

[57] ABSTRACT

A device for fixing members to panels, or joining panels, which has a body moulded from a resilient plastic, comprising a head part and a tail part joined by strip-like connectors which distort when the tail part is pulled towards the head part, and including outwardly deflected wings displaceable inwards to allow the fixing device to be applied.

7 Claims, 6 Drawing Figures

SCREW FIXING DEVICE

FIELD OF THE INVENTION

This invention relates to a screw fixing device and in particular it relates to a plug which can be inserted through an aperture in a panel or wall and when a screw is inserted will be locked in place as a fixing means to either hold a series of panels together or to hold an article against a wall or panel.

THE PRIOR ART

There are in use many forms of anchors and fixing plugs and amongst these are plastic members which can be driven into a wall and can then be engaged by a screw to expand the members tightly into the aperture and also it has been proposed to use various forms of devices which are contracted after they are inserted into an aperture to cause locking against the rear of the member in which the aperture is formed and amongst these are plastic devices in which the head of the device fits against the outside of the member in which the aperture is formed and the tail is engaged by a screw and is moved towards the head to cause expanded portions to engage the rear surface of the member in which the aperture is formed.

THE PRESENT INVENTION

The present invention relates also to that type of apparatus but an object of the invention is to provide a simple and effective form of device which can be used on relatively thin panels either for joining one or more of said panels together or for joining objects to such panels and this is achieved according to this invention by having a head as heretofore through which a screw can be inserted and having a tail with an aperture which can be engaged by the screw but between the head and the tail a series of connectors and on the tail wings which project outwardly to engage behind a panel when the tail is moved towards the head after inserting the device through an aperture by folding down the wings as they pass through the aperture.

Thus according to the preferred form of the invention the device comprises a body moulded from a resilient plastic to have a hollow extending longitudinally through it and of a cross-sectional dimension less than the cross-sectional dimension of the said aperture, a head portion including a portion of an external dimension larger then the aperture at one end of the member, a tail portion on the body being spaced from head portion, the head and said tail portion being spaced apart by connectors peripherally spaced apart around the body but co-extensive with the tail and connected to the head portion whereby to form longitudinal spaces between the connectors, and wings in the said spaces formed integral with the tail portion projecting toward the head portion and of a length to be accommodated in the spaces but moulded to have the wings project outward at their free ends but displaceable inwardly into the spaces when the device is inserted through an aperture, the hollow being of a cross-sectional dimension in the said head portion to freely engage a fixing screw but of a cross-sectional dimension in the tail portion to engage the screw to cause the tail portion to be drawn towards the head portion when the screw is appropriately rotated, whereby the connectors bulge outward to expand the cross-sectional dimension of the device at the locality of the connectors.

BRIEF DESCRIPTION OF THE DRAWINGS

In FIGS. 2, 3 and 4 the screw is shown pulled forward but in practice the head of the screw would press against the outer face of the head of the device, and the space shown could accommodate a member to be held by the device.

DESCRIPTION OF THE PREFERRED EMBODIMENT

Figure 1:
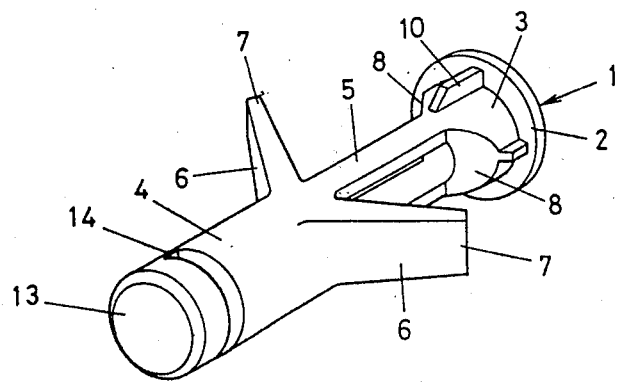
FIG. 1 is a perspective view of the device looking from the tail end.
Figure 2:
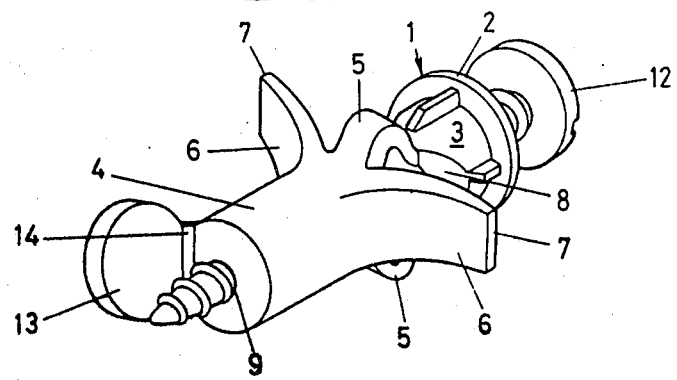
FIG. 2 is a similar view but showing a screw inserted in the device with the screw pulled forward to move the tail towards the head.
Figure 3:
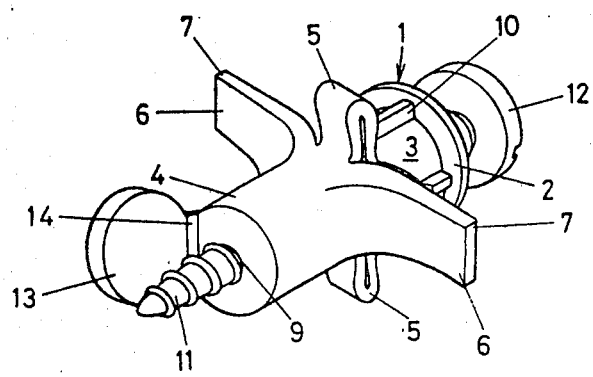
FIG. 3 is a similar view to FIG. 2 but showing the tail pulled further towards the head to fold the connectors to grip behind a panel and distort the wings to also grip the back of the panel.

The head 1 is of circular shape with an expanded portion 2 which is adapted to engage the front face of the panel or the like, into an aperture in which the device is inserted, and the portion 3 immediately behind the expanded portion 2 forms a tubular extension which terminates in the tail 4 but the extension comprises a pair of connectors 5 which join the head to the tail.

Lying in the spaces between these connectors 5 are a pair of wings 6 which extend from the tail 4 and project toward the head, but are of a shape that they can be accommodated in the spaces between connectors so that the device is then of substantially circular cross-section to be engaged through an aperture in a panel or the like.

The device is moulded from a plastic material with sufficient resiliency to allow it to be expanded and shaped by applying pressure thereto and the wings 6 are moulded to project outwardly in the form of an arrow as shown in FIG. 1 and the free ends 7 of the wings are adapted to engage tapered surfaces 8 on the head 1 so that when the wings 6 are folded inwards, the device is of substantial circular cross-section but immediately it has been pushed through an aperture in a panel the wings 6 revert outwardly to the position in which they were moulded to have the ends of the wings then engage the back of the panel some distance outwardly from the aperture through which the device is projected.

Figure 4:
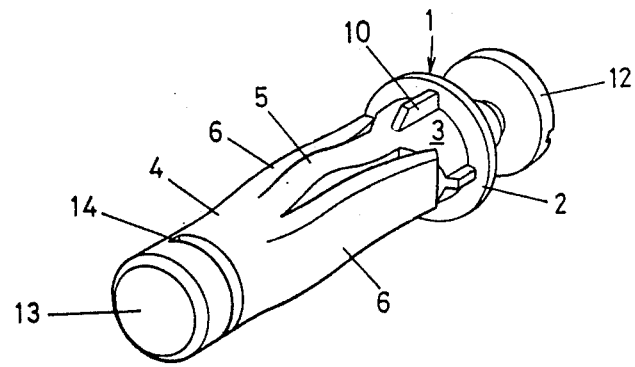
FIG. 4 is a similar perspective view but showing the form the device takes when it is located in an aperture in a thick panel and the screw pulls the tail towards the head.
Figure 5:
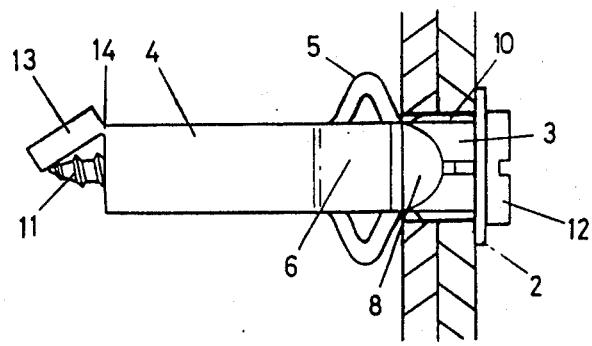
FIGS. 5 and 6 show the device in place in a thin panel and a thick panel or a wall respectively.
Figure 6:
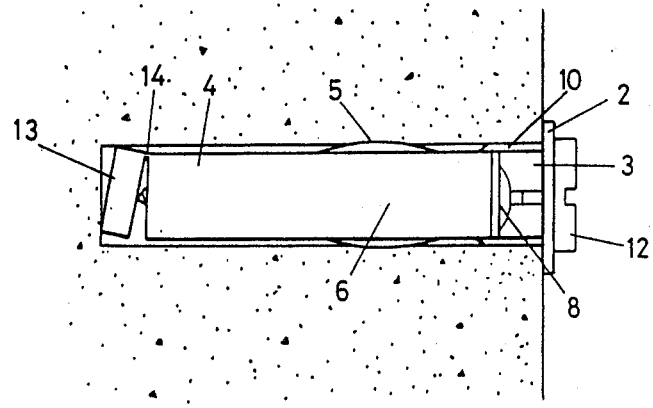

Should the aperture be in a member sufficiently deep to prevent the wings 6 from expanding, such a fixing will still operate because when a screw is inserted through the aperture in the head and is engaged in the threaded hollows 9 in the tail, as the screw is tensioned the tail 4 moves towards the head 1 and the connectors 5 as well as the wings 7 will distort outwardly to jam in the aperture as shown particularly in FIGS. 4 and 6.

If however the panel is relatively thin and the wings 6 expand after they pass through the aperture in the panel, the wings are then outwardly projected and will engage the back surface of the panel as the screw is tensioned to bring the tail 4 towards the head 1, the connectors 5 folding outwardly to also provide a holding means to prevent withdrawal of the device from the aperture.

The rear of the head is provided with fins 10 which lock the head 1 against rotation when these fins 10 are accommodated in the aperture in which the device is inserted and by appropriately shaping the connectors 5, and having a preformed thread in the hollow 9 in the tail which is engaged by the screw, rotation of the screw will move the tail towards the head as the hollow in the head is of a diameter to allow the screw to freely move in it. If there is rotation of the tail by the screw the connectors will wind and will resist the rotation of the tail as will also the outwardly extending wings as soon as they engage the panel to thereby ensure that the tail is held while the screw is tensioned to bring the tail 4 and the wings 6 as well as the connectors 5 into a position where firm holding of the device occurs.

The screw is designated 11 and its head 12.

In the illustrations the tail is shown with a flap 13 connected to the tail at 14, this is not always essential but the purpose of the flap is to provide an extra jamming effect when the device is used in a deep hole in a wall as shown in FIG. 6, at which condition the end of the screw simply pushes the flap 13 away to cause it to jam in the hole and increase the hold at the inner end of the device.

In the conditions of use depicted in FIGS. 2, 3, 4 and 5 the flap 14 is simply pushed aside and serves no further purpose.

While in the foregoing the device has been described as having a head 1 and a tail 4 with a pair of connectors 5 between the head and the tail, and a pair of wings 6 projecting outwardly from the tail 4 towards the head 1, it will be realised that while for general purposes two wings and two connectors are a preferred form it would be possible for instance to have three wings equally spaced around the axis of the device and to have three connectors formed between the portions where the wings join the head, and also while generally it is preferred to so form the wings that they fit into spaces left between the connectors when the device is not tensioned, these wings are moulded to be outwardly positioned but can fit into spaces provided when the unit is pushed through an aperture in a wall.

We claim:

1. A device for fixing members to panels or for joining panels together by engaging the device in an aperture in a panel or panels, which device comprises:
    a tubular body moulded from a resilient plastic having a hollow extending longitudinally through it, a head portion at one end of said tubular body including a portion of an external dimension larger than the said tubular body, a tail portion on said tubular body co-extensive with said body but spaced from said head portion, connectors peripherally spaced apart around the said tubular body co-extensive with the said tail portion and integral to said head portion whereby to form longitudinal spaces adjacent the said connectors between the said head portion and tail portion, and wings in the said spaces formed integral with the said tail portion projecting toward but not attached to the said head portion and of a length to be accommodated in the said spaces but moulded to have the said wings project angularly outward but displaceable inwardly into the said spaces when the device is inserted through an aperture, said hollow in the said head portion being of a cross-sectional dimension to freely engage a fixing screw, but of a cross-sectional dimension in the said tail portion to engage the said screw to cause the said tail portion to be drawn towards the said head portion when the screw is appropriately rotated whereby the said connectors bulge outward to expand the cross-sectional dimension of the said device at the locality of the connectors.

2. A device according to claim 1 wherein two connectors are used placed diammetrically opposite each other about a central axis of the device.

3. A device according to claim 1 wherein the said head portion has outstanding fins to firmly engage in an aperture to hold the said head portion against rotation.

4. A device according to claim 1 wherein that part of the head portion towards which the said wings project is sloped, and the free ends of the wings are arranged to engage the said sloping surface to be guided outwardly against the wall of the said aperture when the device is engaged in an aperture in a panel or wall which has a thickness such that the said tail portion and the said connectors and the said wings are positioned within the said aperture during movement of the said tail portion towards the said head portion.

5. A device according to claim 1 having an unapertured flap at the end of the said body remote from the head and integrally connected to the body along portion of its periphery on one side of the medial axis of the said tubular body.

6. A device according to claim 4 or 5 having a screw inserted in the said hollow.

7. A device for fixing members to panels or for joining panels together by engaging the device in an aperture in a panel or panels, which device comprises:
    a tubular body moulded from a resilient plastic, a head portion at one end of the said body including a portion of an external dimension larger than the said tubular body, a tail portion on said body spaced from said head portion but co-extensive therewith, said head and said tail portion being connected together by connectors peripherally spaced apart around the said body but co-extensive with the said tail portion and connected to said head portion whereby to form longitudinal spaces between the said connectors, and wings in the said spaces formed integrally at one end with the said tail portion and projecting toward the said head portion but not attached thereto and of a length to be accommodated in the said spaces but moulded to have the said wings project outward but displaceable inwardly into the said spaces when the device is inserted through an aperture, said head portion having an axially positioned hollow of a cross-sectional dimension to freely engage a fixing screw passed through the hollow of the head, said tail having an aperture partway through it of a cross-sectional dimension to engage the said screw to cause the said tail portion to be drawn towards the said head portion when the screw is appropriately rotated, said unapertured portion of the tail forming a flap hinged along one peripheral portion to the said tail on one side of a medial axis of said tubular body, whereby the said connectors bulge outward to expand the cross-sectional dimension of the said device at the locality of the connectors when the said screw is rotated and the said flap is pushed sideways about the hinge by the end of the screw as it passes through the hollow of the said tail portion.

* * * * *